United States Patent [19]

Moser

[11] Patent Number: 5,316,133

[45] Date of Patent: May 31, 1994

[54] MOVABLE FLOOR MECHANISM

[75] Inventor: William H. Moser, Paris, Tex.

[73] Assignee: Mosermatic, Inc., Paris, Tex.

[21] Appl. No.: 72,175

[22] Filed: Jun. 3, 1993

[51] Int. Cl.$^5$ ............................................. B65G 17/06
[52] U.S. Cl. ..................................... 198/850; 198/750
[58] Field of Search .............. 198/750, 850, 851, 853, 198/834

[56] References Cited

U.S. PATENT DOCUMENTS

| | | |
|---|---|---|
| 527,723 | 10/1894 | Sargent . |
| 1,717,843 | 6/1929 | Hollnagel . |
| 1,945,532 | 2/1934 | Lima . |
| 2,359,745 | 10/1944 | Butler ............................... 198/853 |
| 2,363,932 | 11/1944 | Beers ................................ 198/853 |
| 2,465,929 | 3/1949 | Rixon ............................... 198/850 |
| 2,541,632 | 2/1951 | Baugh .............................. 198/850 |
| 2,594,342 | 4/1952 | Pettyjohn . |
| 2,679,941 | 6/1954 | Roesies . |
| 2,916,169 | 12/1959 | De Witt . |
| 3,311,222 | 3/1967 | Crawford et al. . |
| 3,482,717 | 12/1969 | Moser . |
| 3,621,986 | 11/1971 | Webb . |
| 3,680,927 | 8/1972 | Neureyther ..................... 198/850 X |
| 3,699,247 | 10/1972 | Mashima . |
| 3,731,825 | 5/1973 | Holland et al. . |
| 3,831,785 | 8/1974 | Rezac ............................. 198/750 X |
| 3,876,089 | 4/1975 | Moser . |
| 3,888,366 | 6/1975 | Prahst ............................ 198/750 X |
| 3,913,760 | 10/1975 | Koral . |
| 4,004,682 | 1/1977 | Schuler .......................... 198/853 X |
| 4,016,971 | 4/1977 | Komossa et al. .................. 198/850 |
| 4,518,303 | 5/1985 | Moser . |
| 4,893,709 | 1/1990 | Schroeder et al. ................. 198/852 |
| 4,981,210 | 1/1991 | Kornylak ........................ 198/850 X |
| 5,024,321 | 6/1991 | Lapeyre ............................ 198/853 |
| 5,094,341 | 3/1992 | McGrath ........................... 198/750 |

FOREIGN PATENT DOCUMENTS 0201317 11/1986 European Pat. Off. ............ 198/853

OTHER PUBLICATIONS

Article from "Trailer/Body Buildings" Magazine, pp. 50-53, Entitled Diversification the Best Farm Aid for Fargo Company (Jan. 1986).
Brochure by Red River Mfg, West Fargo, N.D. "Red River Live Bottom Trailers" (no date).
Advertisement by Keith Mfg. Co., Madras, Oreg., "Keith Walking Floor" (no date).
Magazine Article from "Tailer/Body Builders", p. 42, Production Begins May 1 on New CMI Load King Rear-Discharge Trailer (no date).
Brochure from Farm Bed Mfg., Inc., "Eagle Bridge" (no date).
Brochure from Flow Boy Mfg., "Products That Keep Your Work Flowing Smoothly" (no date).
Brochure by Ejecto Corporation, Hurst, Texas, "Ejecto Control" (Jan. 1968).
Bulletin No. 111 from Peerless, "Live Floor Transports" (no date).
Advertisement from Ravens Metal Products, "The Ravens Eclipse" (no date).
Brochure by Ravens Metal Products, Inc., "Ravens" (Jan. 1992).

Primary Examiner—D. Glenn Dayoan
Attorney, Agent, or Firm—Hubbard, Tucker & Harris

[57] ABSTRACT

A movable floor mechanism (10) is adapted for placement in the bed of a truck. The mechanism includes a frame (12, 14, 16), a movable floor (26) encircling the frame, a motor (24) attached to the frame, and at least one sprocket (22) attached to the motor, the sprocket engaging the movable floor. The frame is made from a pair of longitudinal beams (12), a plurality of lateral beams (14) attached between the longitudinal beams, and at least one guide rail (16) attached to the lateral beams. The movable floor (26) is made from a plurality of interengaged floor elements (26a, 26b). Each of the floor elements is made from a central portion, a connector, and a receptor, wherein the receptor is configured to accept the connector of an adjacent floor element. The receptor contains an axial slot (52) and the connector contains a pin receiving hole (56). When two floor elements are engaged the axial slot of the first floor element and pin receiving hole of the second floor element align to receive a pin (54).

4 Claims, 2 Drawing Sheets

MOVABLE FLOOR MECHANISM

TECHNICAL FIELD OF THE INVENTION

The present invention relates to a movable floor mechanism and specifically to a mechanism mountable in the bed of a truck for unloading a specified amount of material hauled therein. The movable floor mechanism is formed by a plurality of interengaged floor elements.

BACKGROUND OF THE INVENTION

Trucks have long been used to haul material to a location for unloading. To unload the material from the truck bed, the operator might have to physically remove the material by hand, or perhaps with the aid of a shovel. Dump trucks were developed to allow the front of the truck bed to be elevated, allowing gravity to pour the material from the truck bed. While eliminating the physical labor, dump trucks do not provide much control over the amount of material being unloaded. Additionally, the action of pivoting the trailer bed produces significant stress on the underlying vehicle frame. These stresses necessitate the use of heavier frames.

A solution to the problems presented by standard dump truck design is presented in U.S. Pat. No. 4,518,303 to Moser entitled "Movable Floor Self-Unloading Trailer" which issued on May 21, 1985. Moser '303 discloses a self-unloading trailer having a frame with a rotatable sprocket shafts supported at each end and engaged with an endless conveyor type floor. The floor is comprised of a series of side-by-side floor plates which are interconnected by hinge pins and are provided with a plurality of laterally spaced bearing shoes which slide in elongated longitudinally extending channel shaped bearing rails. The movable floor includes a drive sprocket assembly characterized by a series of sprocket segments which are configured to engage the floor plates along the bearing hinge portions. The movable floor is particularly adapted for use in conjunction with a modified general cargo type truck trailer.

An alternate design is disclosed in Moser '089 issued on Apr. 8, 1975 and entitled "Conveyor Equipment, Especially Cargo Loading and Unloading Equipment for a Vehicle." The conveyor includes a slatted floor carried on lugs that are in turn mounted on a closed loop cable. The cable is trained over and driven by notched sheaves at each end of the conveyor frame. The lugs evenly spaced and the slats are attached to the lugs. In one embodiment, the ends of the slats are bent upwardly to provide a conveyer surface which is generally trough shaped.

A need exists for an improved movable floor mechanism. An improved movable floor mechanism should provide a practically seamless surface adjacent to the loaded material. Any open seam is likely to catch large particles such as pebbles and stones which could jam the mechanism. Any exposed seam should be self-cleaning when the floor goes from a curved to a flat configuration. The improved movable floor mechanism should be self interengageable, thereby not requiring the placement of any hinge pins to couple adjacent floor elements. The improved floor should also freely slide over its frame, not relying upon the alignment of bearings with a bearing slide rail.

SUMMARY OF THE INVENTION

The present movable floor mechanism is adapted for placement in the bed of a truck. The mechanism includes a frame, a movable floor encircling said frame, a motor attached to said frame, and at least one sprocket attached to said motor, the sprocket engaging the movable floor. The frame comprises a pair of longitudinal beams, a plurality of lateral beams attached between said longitudinal beams, and at least one guide rail attached to said lateral beams. The movable floor comprises a plurality of interengaged floor elements. Each of said floor elements comprises a central portion, a connector, and a receptor, wherein said receptor is configured to accept the connector of an adjacent floor element. The receptor contains an axial slot and said connector contains a pin receiving hole. When two floor elements are engaged the axial slot of the first floor element and pin receiving hole of the second floor element align to receive a pin. Each sprocket comprises a planar body with a plurality of axial projections, said projections separated by a plurality of notches Each receptor has an inner radius of curvature and an outer radius of curvature. Likewise, each notch in the sprocket has a radius of curvature. To improve the movement of the movable floor over the sprockets, the notch radius of curvature should be greater than or equal to the receptor outer radius. Also, the central portion of each floor element is approximately the width of the axial projections of said sprockets.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
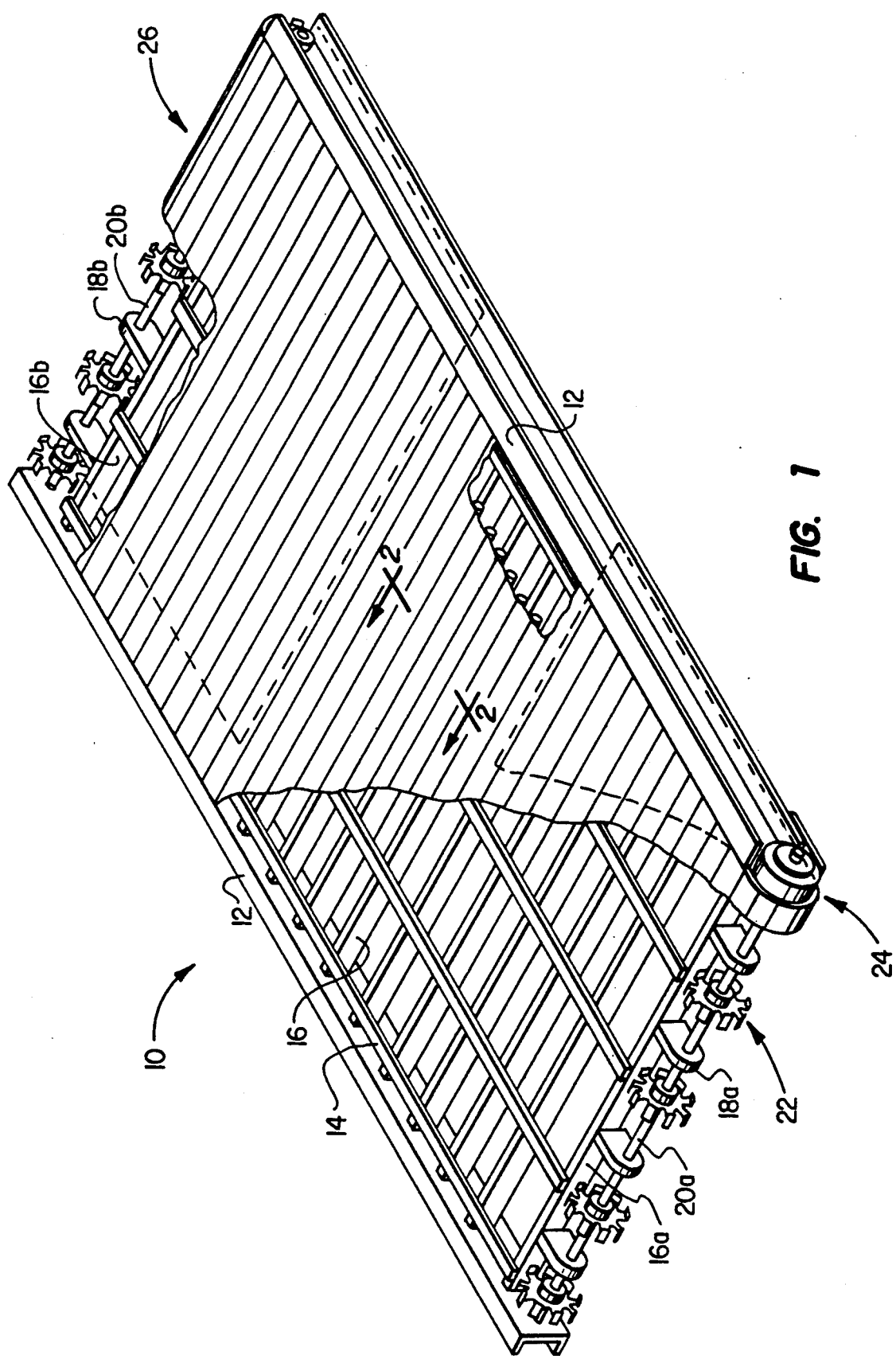
FIG. 1 illustrates a perspective view of the movable floor mechanism with a cutaway to show the underlying frame and sprocket assembly.

The present invention is a movable floor mechanism that overcomes many of the disadvantages in the prior art. Referring to FIG. 1, a movable floor mechanism 10 embodying the present invention is disclosed. The movable floor mechanism involves a frame with a pair of outer longitudinal beams 12 connected by a plurality of lateral beams 16. A plurality of guide rails 14 attach to and extend across the lateral beams 16. The guide rails are generally parallel to the longitudinal beams 12. The frame can be dimensioned to fit within the bed of almost any truck, trailer, or semi-trailer.

A plurality of shaft support means 18a, 18b extend from the outermost lateral beams 16a and 16b. A first shaft 20a is rotatably supported by the shaft support means 18a attached to lateral beam 16a. A second shaft 20b is rotatably supported by the shaft support means 18b attached to the lateral beam 16b. A plurality of sprockets 22 are attached to each shaft 20a, 20b. Each sprocket 22 has a plurality of radial spokes. Each spoke can have a lug attached thereto. The lugs engage the bottom of the floor 26. A motor 24 is attached to the frame and coupled to the first shaft 20a. The motor 24 can rotate the shaft and attached sprockets 22 thereby moving the movable floor 26.

The movable floor 26 can fully encircle the frame. However, the movable floor need only encircle slightly more than half of the frame. When loaded, the movable floor 26 should envelope the upper surface of the frame and extend over the sprockets and back under the frame a small distance. The movable floor 26 has a first and second end. The first and second ends are attached by connection means 27. To unload the material, the motor is activated to rotate the sprockets. As the sprockets 22 rotate, the floor is translated along the guide rails 14 toward the open rear end of the truck. After a predetermined amount of material is unloaded, the motor can be deactivated. The movable floor can also be useful in the loading process. As material is added to the open rear end of the truck onto the movable floor mechanism, the floor and load can be advanced away from the loading, thereby providing additional empty floor. This eliminates the need to carry or load material to the front of the bed.

Figure 2:
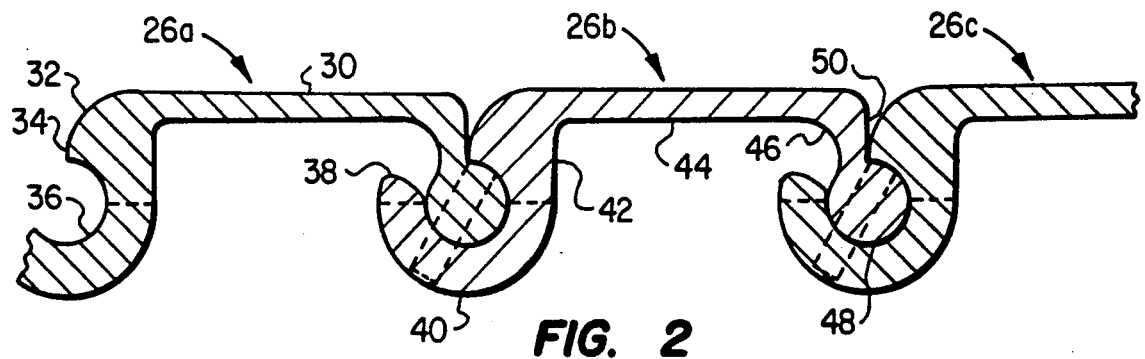
FIG. 2 is a side sectional view of the several floor elements interlinked to form the movable floor.

Referring to FIG. 2, interengaged floor elements 26a, 26b, and 26c form floor 26. Each floor element is identical in shape and size. For example, floor element 26a comprises a central portion, a connector, and a receptor formed by a plurality of surfaces. The central portion is formed by a first surface 30 which is flat. A second surface 32 creates a curved transition leading to a third surface 34 which is flat. The receptor is formed by the fourth surface 36. The fourth surface 36 is generally circular covering an arc of approximately 270 degrees. A fifth surface 38 is curved in the opposite direction of the fourth surface 36. A sixth surface 40 is concentric with the fourth surface 36 but only spans an arc of approximately 180 degrees. The sixth surface 40 transitions into a flat seventh surface 42. An eighth surface 44 is generally parallel to the first surface 30. A ninth surface 46 is a curved transition from the central portion to the connector. The ninth surface is complementary to the fifth surface 38. A tenth surface 48 is generally circular and complements the fourth surface 36. Between the tenth surface 48 and the first surface 30 is an eleventh surface 50. The eleventh surface 50 is complementary to the third surface 34.

The central portion of the floor element 26a is defined between the first and eighth surfaces 30, 44. The receptor is defined by the second, third, fourth, fifth, sixth, and seventh surfaces 32, 34, 36, 38, 40, and 42. The connector is defined by the ninth, tenth and eleventh surfaces 46, 48, and 50. The connector of floor element 26a will fit into the receptor of floor element 26b and so forth.

The connector can rotate within the receptor due to the complementary fourth and tenth surfaces 36, 48. Therefore, adjacent floor elements can be rotated relative to each other allowing the floor 26 to curve around the frame and sprockets. The arc of rotation between adjacent floor elements is limited in one direction by the abutment of the fifth and ninth surfaces 38, 46, and in the other direction by the abutment of the third and eleventh surfaces 34, 50. The arc of rotation is generally under 90 degrees.

In one embodiment, the radius of curvature for the fourth surface 36 is approximately 0.125 inches, and the radius of curvature of the sixth surface 40 is approximately 0.625 inches. Likewise, the radius of curvature for the tenth surface 48 is also 0.125 inches. In this embodiment, the central portion can heave a length of approximately 2.2 inches. The distance between the first and eighth surfaces 30, 44 is approximately 0.20 inches. Of course, the floor 26 can be sized to whatever dimensions are appropriate for the application. In one embodiment, each floor element is made of extruded aluminum.

Figure 3:
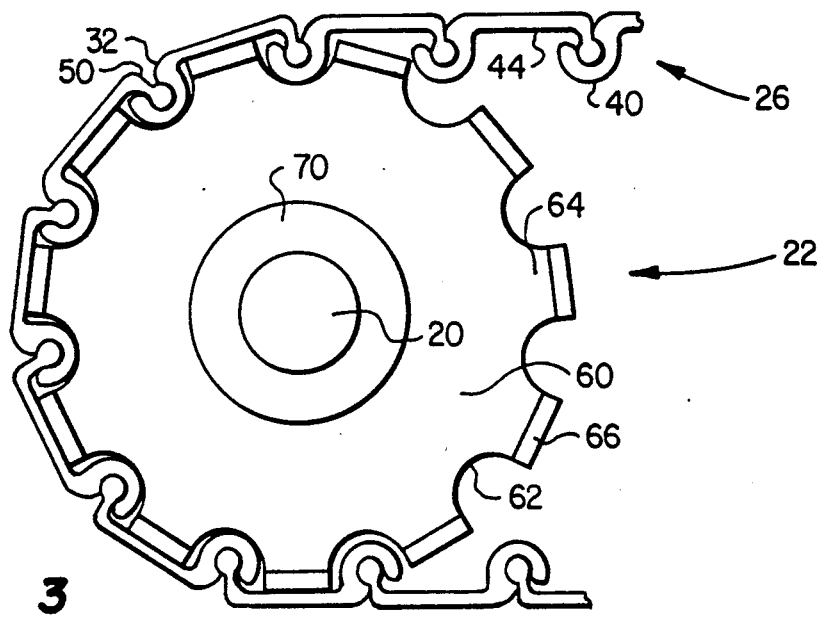
FIG. 3 is a side view of the movable floor engaged with a sprocket.

FIG. 3 illustrates the floor 26 engaging one of the sprockets 22. Each sprocket 22 is attached to the shaft 20 by a bearing assembly 70. The sprocket 22 is generally planar with a body 60 and radial projections 64. Each radial projection is separated by a notch 62. A lug 66 is attached to the distal portion of each radial projection. The width of each radial projection 64 is dimensioned slightly less than the width of the eighth surface 44. The lug 66 provides additional contact area for force transmission between the sprocket 22 and the floor 26. The radius of curvature of each notch 62 is slightly larger than the radius of curvature for the sixth surface 40 to allow for easier engagement and disengagement between the sprocket and the floor. In a flat configuration, surfaces 32 and 50 are adjacent to each other. When the movable floor curves around sprocket 22, the surfaces 32 and 50 separate. Any debris within the seam between the two surfaces can fall away as the movable floor moves around the sprocket. Likewise, referring to FIGS. 3 and 4, surfaces 38 and 46 are apart when the movable floor is flat and together when the movable floor is curved around the sprocket.

Figure 4:
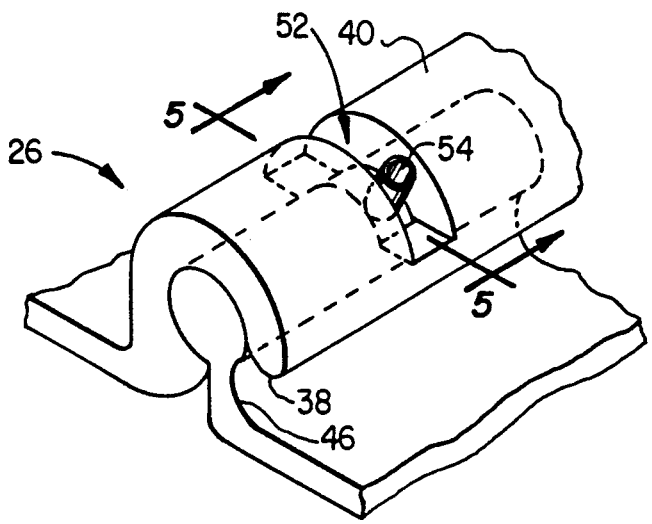
FIG. 4 is a perspective view of two interengaged floor elements having a pin and slot arrangement to prevent lateral displacement.
Figure 5:
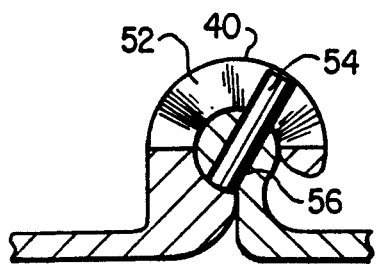
FIG. 5 is a side sectional view across the pin and slot illustrating the engagement of the pin into the ball of the first floor element.

Referring to FIGS. 4 and 5, an axial slot 52 is cut in the sixth surface 40 near the edge of the floor element. Each floor element is interengaged by sliding the connector axially into the receptor. To prevent axial movement of the interengaged floor elements, a pin 54 is driven into a receiving hole 56 in the connector. The pin can rotate within the axial slot 52 as the floor elements rotate, while contact with the walls of the axial slot prevent axial motion. The receiving hole 56 can penetrate the connector. To disengage adjacent floor elements, the pin 54 must be removed. To remove the pin, the adjacent interengaged floor elements are rotated to expose the base of the pin 54 which can then be driven out of the receiving hole. The interengaged floor elements are then axially displaced.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A movable floor mechanism comprising:
   (a) a frame;
   (b) a movable floor at least partially encircling said frame;
   (c) a motor attached to said frame; and (d) at least one sprocket attached to said motor, the sprocket engaging the movable floor, wherein said movable floor comprises a plurality of interengaged floor elements, wherein each of said floor elements comprises a central portion, a connector, and a receptor, wherein said receptor is configured to accept the connector of an adjacent floor element, and wherein said receptor contains an axial slot and said connector contains a pin receiving hole, wherein said axial slot and pin receiving hole are aligned to receive a pin.

2. A movable floor mechanism comprising:
(a) a frame comprising:
 (i) a pair of longitudinal beams;
 (ii) a plurality of lateral beams attached between said longitudinal beams; and
 (iii) at least one guide rail attached to said lateral beams;
(b) a movable floor partially encircling said frame, wherein said movable floor comprises a plurality of interengaged floor elements, said movable floor having a first and second end attached by connection means, wherein each of said floor elements comprises a central portion, a connector, and a receptor, wherein said receptor is configured to accept the connector of an adjacent floor element;
(c) a motor attached to said frame; and
(d) at least one sprocket attached to said motor, the sprocket engaging the movable floor,
wherein said receptor contains an axial slot and said connector contains a pin receiving hole, wherein said axial slot and pin receiving hole are aligned to receive a pin.

3. A movable floor for use in a movable floor mechanism, said floor comprising a plurality of interengageable floor elements wherein each floor element has a central portion, a receptor, and a connector,
 wherein said receptor defines an axial slot and the connector defines a pin receiving hole, wherein said axial slot of a first floor element aligns with the pin receiving hole of a second floor element engaged thereto.

4. A movable floor for use in a movable floor mechanism, said floor comprising a plurality of interengageable floor elements wherein each floor element has a central portion, a receptor, and a connector, and a pin,
 wherein said receptor defines an axial slot and the connector defines a pin receiving hole, wherein said axial slot of a first floor element aligns with the pin receiving hole of a second floor element engaged thereto, and wherein said pin engages said pin receiving hole.

* * * * *